(12) United States Patent
Cheswick (10) Patent No.: US 11,128,744 B2
(45) Date of Patent: Sep. 21, 2021

(54) FLEXIBLE AND COLLAPSIBLE STAND AND SHOULDER REST FOR PORTABLE ELECTRONIC DEVICES

(71) Applicant: Erika H. Cheswick, San Diego, CA (US)

(72) Inventor: Erika H. Cheswick, San Diego, CA (US)

(*) Notice: Subject to any disclaimer, the term of this patent is extended or adjusted under 35 U.S.C. 154(b) by 0 days.

(21) Appl. No.: 16/526,951

(22) Filed: Jul. 30, 2019

(65) Prior Publication Data

US 2020/0036825 A1 Jan. 30, 2020

Related U.S. Application Data

(60) Provisional application No. 62/712,164, filed on Jul. 30, 2018.

(51) Int. Cl.
| | |
|---|---|
| F16M 13/00 | (2006.01) |
| H04M 1/04 | (2006.01) |
| F16M 13/04 | (2006.01) |
| H04B 1/3888 | (2015.01) |

(52) U.S. Cl.
CPC .............. *H04M 1/04* (2013.01); *F16M 13/04* (2013.01); *H04B 1/3888* (2013.01)

(58) Field of Classification Search
CPC ................................. A47B 97/04; A47B 97/08
USPC ................ 248/460, 446, 447, 454, 455, 457
See application file for complete search history.

(56) References Cited

U.S. PATENT DOCUMENTS

| | | | | |
|---|---|---|---|---|
| 588,636 | A * | 8/1897 | Engstrom | A47B 97/08 248/465 |
| 2,805,504 | A * | 9/1957 | Stein | A47G 1/141 40/603 |
| 4,379,373 | A * | 4/1983 | Transport | G09F 1/06 40/124.09 |
| 5,056,250 | A * | 10/1991 | Weissleder | G09F 1/06 40/539 |
| 5,451,026 | A * | 9/1995 | Smith | A47G 1/142 248/469 |
| 6,260,901 | B1 * | 7/2001 | Torefors | B05B 13/02 248/309.1 |
| D741,070 | S * | 10/2015 | Martin | D6/310 |
| D896,805 | S * | 9/2020 | Stagge | D14/253 |
| 2012/0006950 | A1 * | 1/2012 | Vandiver | F16M 11/105 248/176.3 |
| 2018/0343025 | A1 * | 11/2018 | Kim | H02J 7/025 |

* cited by examiner

*Primary Examiner* — Steven M Marsh
(74) *Attorney, Agent, or Firm* — Scott H. Davison; Musick Davison LLP (57) ABSTRACT

A flexible and collapsible stand and shoulder rest for a portable electronic device is provided, the stand and shoulder rest comprising a base plate securely attached with a back surface of a portable electronic device and a flexible top plate securely attached with a center portion of the base plate such that one or both end portions of the top plate can bend away from the base plate into a curved position, the end portions secured in the curved position by slidable support mounts which slide out from the base plate as the top plate bends into the curved position.

12 Claims, 8 Drawing Sheets

FLEXIBLE AND COLLAPSIBLE STAND AND SHOULDER REST FOR PORTABLE ELECTRONIC DEVICES

BACKGROUND

Field of the Invention

This invention relates generally to a stand and shoulder rest for a portable electronic device, and more specifically to a flexible and collapsible stand and shoulder rest mounted on a back surface of a portable electronic device.

Related Art

As portable electronic devices such as smartphones and tablets continue to evolve into thinner housings with varying sizes, the number of cases, mounts and accessories expands exponentially. Cases are purchased for a variety of reasons, but other accessories are often added onto a case or a smartphone to provide additional functionality, such as grips, mounts, stands, batteries and even pure aesthetics. Many of these accessories are limited by their size or dimension, including the inability to maintain an overall thin form factor of the smartphone or tablet. Additionally, many of these accessories provide only a single functionality, requiring a user to select only one for attachment to their smartphone in lieu of others that would occupy the same location on the smartphone or be incompatible with each other during use.

Therefore, it is still desirable to develop mounts and cases which securely and unobtrusively attach with a portable electronic device and allow for improved use of the device by the user.

SUMMARY

Embodiments described herein provide for a flexible and collapsible stand and shoulder rest for a portable electronic device, the stand and shoulder rest comprising a base plate securely attached with a back surface of a portable electronic device and a flexible top plate securely attached with a center portion of the base plate such that one or both end portions of the top plate can flexibly extend away from the base plate into an extended position, the end portions secured in the extended position by slidable support mounts which slide out from the base plate as the top plate extends into the extended position.

In one embodiment, a stand and shoulder rest for a portable electronic device comprises: a base plate securely attached with a back surface of the portable electronic device; a flexible top plate with a center portion and two adjacent end portions, the center portion securely attached with the base plate and at least one of the two adjacent end portions configured to flexibly extend from a flat position parallel to the back surface of the portable electronic device into an extended position at an approximately acute angle relative to the base plate; and flexible plate support mounts hingedly connected with the end portions of the flexible plate on a first end and slidably secured within end portions of the base plate on a second end such that the second end of the support mounts are configured to slide from a closed position parallel to the back surface of the portable electronic device into an extended position substantially perpendicular to the back surface of the portable electronic device to support the end portions of the flexible plate in the extended position.

In another embodiment, a method of using a stand for a portable electronic device comprises the steps of: securing a base plate with a back surface of a portable electronic device; extending at least one end portion of a top plate away from the base plate into an extended position; securing the at least one end portion of the top plate in the extended position with a slidable support mount hingedly connected with a lower surface of the top plate and slidably connected with an opening in the base plate.

Other features and advantages of the present invention will become more readily apparent to those of ordinary skill in the art after reviewing the following detailed description and accompanying drawings.

BRIEF DESCRIPTION OF THE DRAWINGS

The structure and operation of the present invention will be understood from a review of the following detailed description and the accompanying drawings in which like reference numerals refer to like parts and in which.

DETAILED DESCRIPTION

Certain embodiments disclosed herein provide for a flexible and collapsible stand and shoulder rest for a portable electronic device, the stand comprising a base plate securely attached with a rear surface of a portable electronic device and a flexible top plate securely attached at a center portion with a corresponding center portion of the base plate such, the top plate having end portions on either side of the center portion which extend outward from the base plate into an extended position, the end portions optionally secured in the extended position by support mounts hingedly attached with the top plate and which slide out between the base plate and the top plate as the top plate extends into the open, extended position. With both end portions of the top plate in the extended position, the device is capable of functioning as both a stand to stand the portable electronic device at a raised angle on a flat surface and as a shoulder rest to rest against a curved shoulder of a user and aid the user in retaining the portable electronic device against the user's ear when using the portable electronic device as a phone. Additional configurations of the device also provide for only one end portion to be extended, in which case the device may function as a vertical stand for the portable electronic device or as an alternative configuration of the shoulder rest.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
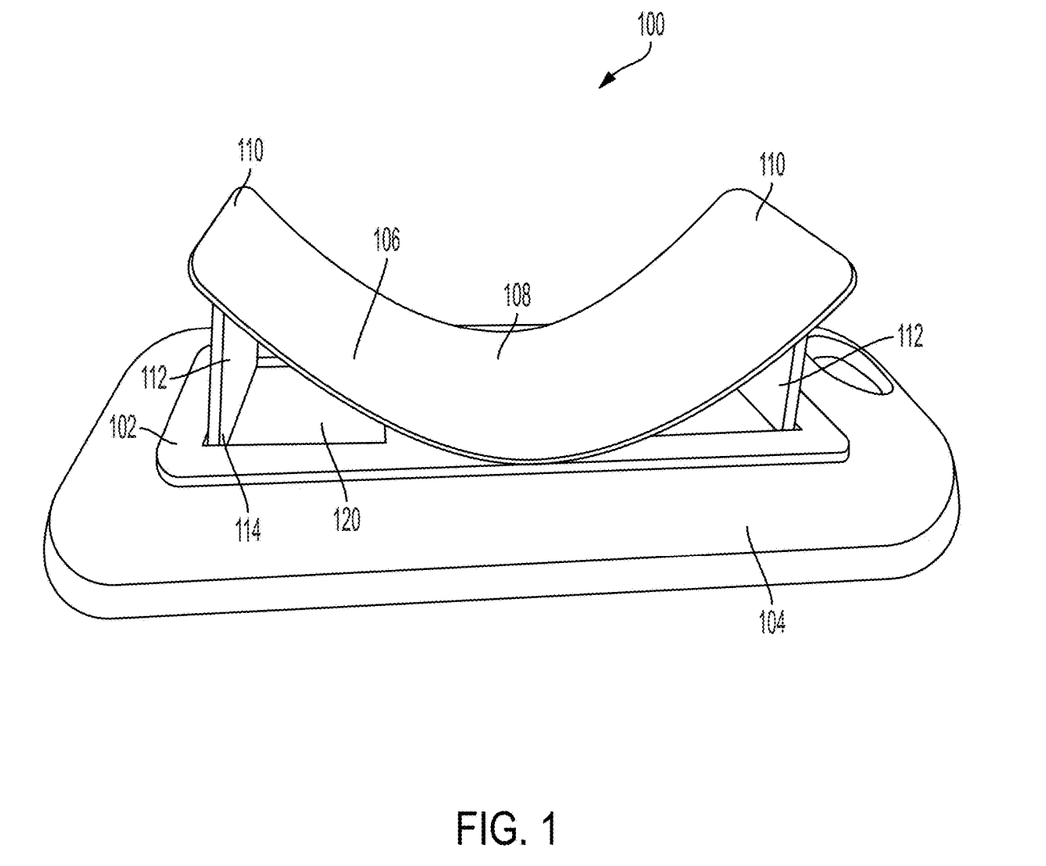
FIG. 1 is an illustration of a flexible stand illustrating a base plate secured to a portable electronic device and a top plate secured in an extended position by support arms, according to an embodiment of the invention.

FIG. 1 is an illustration of one embodiment of the stand and shoulder rest 100 showing a base plate 102 securely attached with a back surface 104 of a portable electronic device, where in this case the stand and shoulder rest 100 is in an open, or extended, position. The extended position in this embodiment refers to a curved, angled shape of a flexible top plate 106 relative to the base plate 102, the top plate 106 being securely attached with the base plate 102 at a center portion 108 of the top plate. The top plate 106 then slowly extends away from the base plate 102 at a curved angle to opposing end portions 110 while the center portion 108 remains secured with the base plate 102. This extended position thus creates an approximately acute angle between each extended end portion 110 and the base plate 102 so that the extended flexible top plate 106 acts as a stand to maintain the portable electronic device in a substantially upright position or as a shoulder rest where the end portions 110 abut a shoulder area of a user when the user wishes to place the portable electronic device against their ear for speaking and listening during a phone call.

In one embodiment, the end portions 110 on lateral ends of the flexible top plate 106—which are the greatest distance from the base plate 102 in the extended position—may be supported by support mounts 112 disposed within an opening 120 in the base plate 102 such that a first end 114 of the slidable support mount 112 is slidably attached with the base plate 102. A second end 116 of the slidable support mount 112 (see FIG. 5) may be hingedly attached with a bottom surface 118 of the flexible top plate 106 at the end portion 110.

Figure 2:
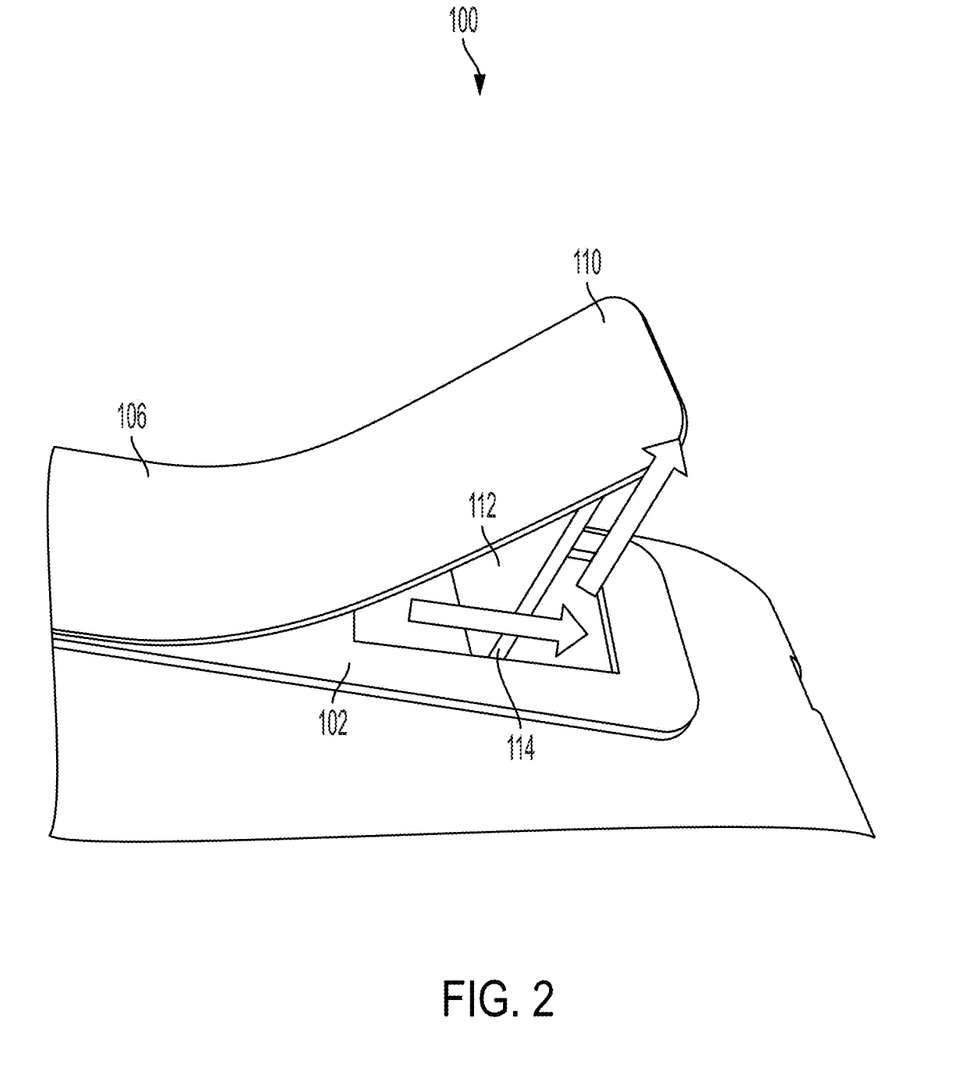
FIG. 2 is an illustration of one end of the flexible stand as the top plate and support arm is being moved from a flat, non-extended position into the extended position, according to an embodiment of the invention.
Figure 3:
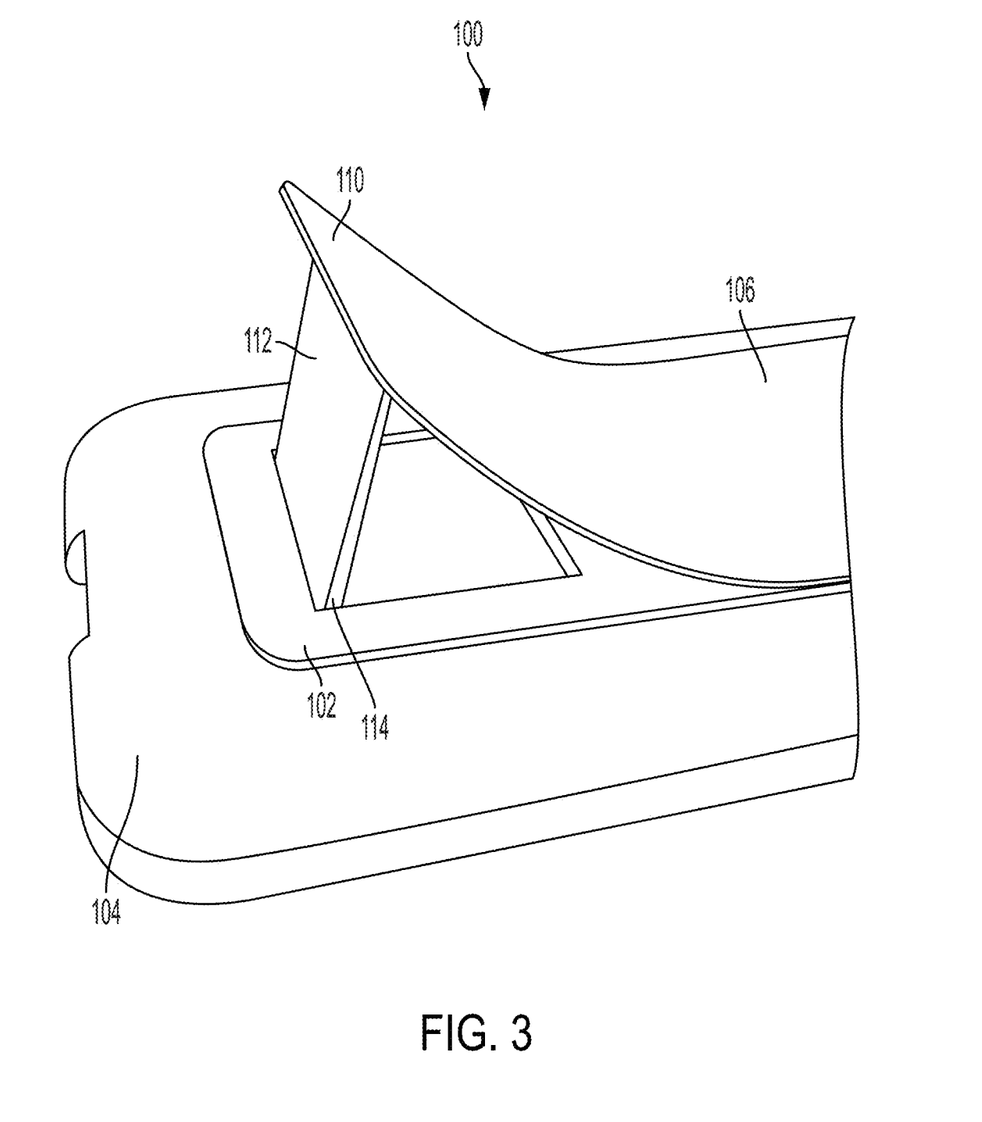
FIG. 3 is an illustration of one end of the flexible stand in the extended position showing a fully-extended and locked position of the support arm, according to an embodiment of the invention.

FIG. 2 illustrates the movement of the stand and shoulder rest from a flat, un-extended position (shown in FIG. 4) to the angled, extended position in FIG. 1, where the support mount 112 slides open (shown by the horizontal directional arrow) as the end portion 110 of the flexible top plate 106 bends outward from the base plate 102 (shown by the vertical directional arrow). The slidable support mounts 112 move from a position parallel to and embedded within the openings 120 of the base plate 102 into an extended, locked position disposed substantially perpendicularly to the base plate 102, as shown in FIG. 3. The particular angle of the slidable support mounts with respect to the base plate may vary significantly depending on the dimensions of the base plate, flexible top plate and position of the slidable support mount, although the particular angle is not important as long as it provides adequate support for the end portions 110 of the flexible top plate 106.

In one embodiment, the slidable attachment of the first end 114 of the slidable support mount 112 with the base plate 102 may be achieved with a parallel track disposed on opposing lateral interior walls of the opening 120 in the base plate 102, where the first end 114 of the slidable support mount 112 includes posts extending into the parallel track to keep the first end 114 secured with the base plate. In one embodiment, the track may include customized indentations within intervals in the track length that allow the posts to more securely lock into a particular position where the flexible top plate 106 is fully extended or partially extended. This would allow a user to choose the distance the flexible plate 106 extends from the base plate, which would in turn affect the angle at which the portable electronic device rests on a flat surface. In other words, the greater the curvature and extension of the flexible top plate 106 from the base plate 102, the less perpendicular the angle of the portable electronic device with respect to a surface on which it rests.

Other mechanisms may be utilized to allow the support mount 112 to move between positions while supporting the curved shape of the flexible plate 106, including allowing the support mounts to freely move at the first end 114 from the closed, un-extended position to the open, extended position where a securing mechanism secures the first end 114 only at those two positions.

Figure 4:
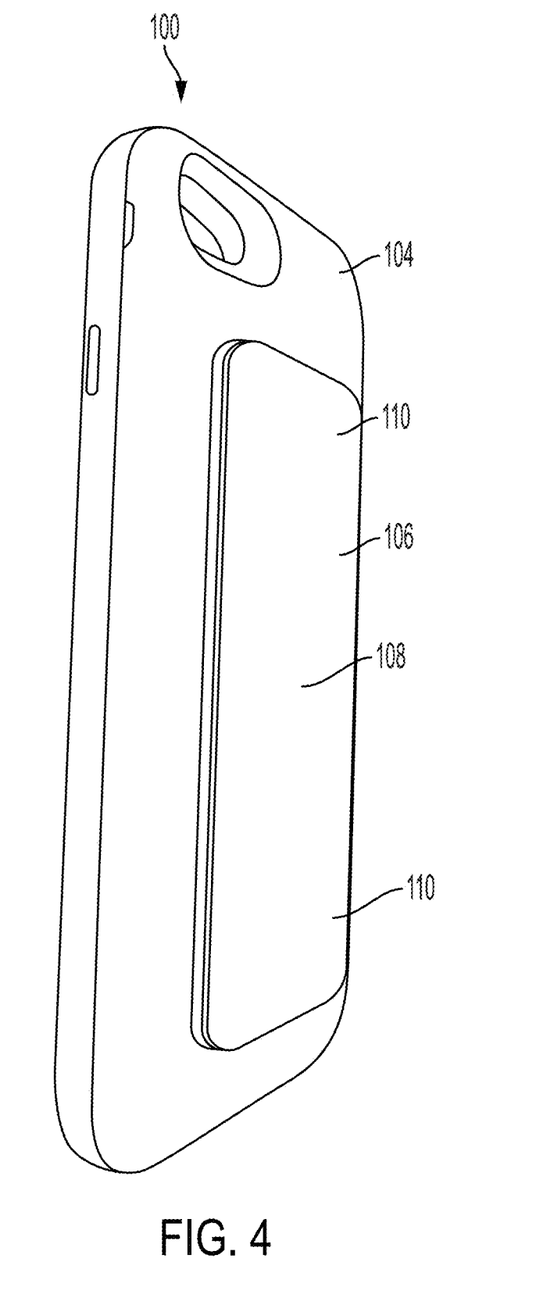
FIG. 4 is an illustration of the flexible stand in a flat, un-extended position and secured with the portable electronic device, according to one embodiment of the invention.

FIG. 4 illustrates the stand and shoulder rest 100 in the closed, un-extended position, where the flexible top plate 106 lies flat and parallel to the base plate 102. The slidable support mounts 112 are disposed in their closed positions within the openings 120 in the base plate to enable the flexible top plate to lie completely flat against the base plate 102. In one embodiment, the base plate may be integrated into a case or cover of the portable electronic device that provides a cover over a larger portion of the device housing. The flexible top plate 106 may also be integrated within a case or cover of the portable electronic device such that the entire stand and shoulder rest is disposed entirely within the housing of the case in the closed position to provide a smooth back surface 104 of the portable electronic device. The closed position of the stand and shoulder rest allows a user to easily carry and store the portable electronic device in a small space when the stand and shoulder rest is not in use.

Figure 5:
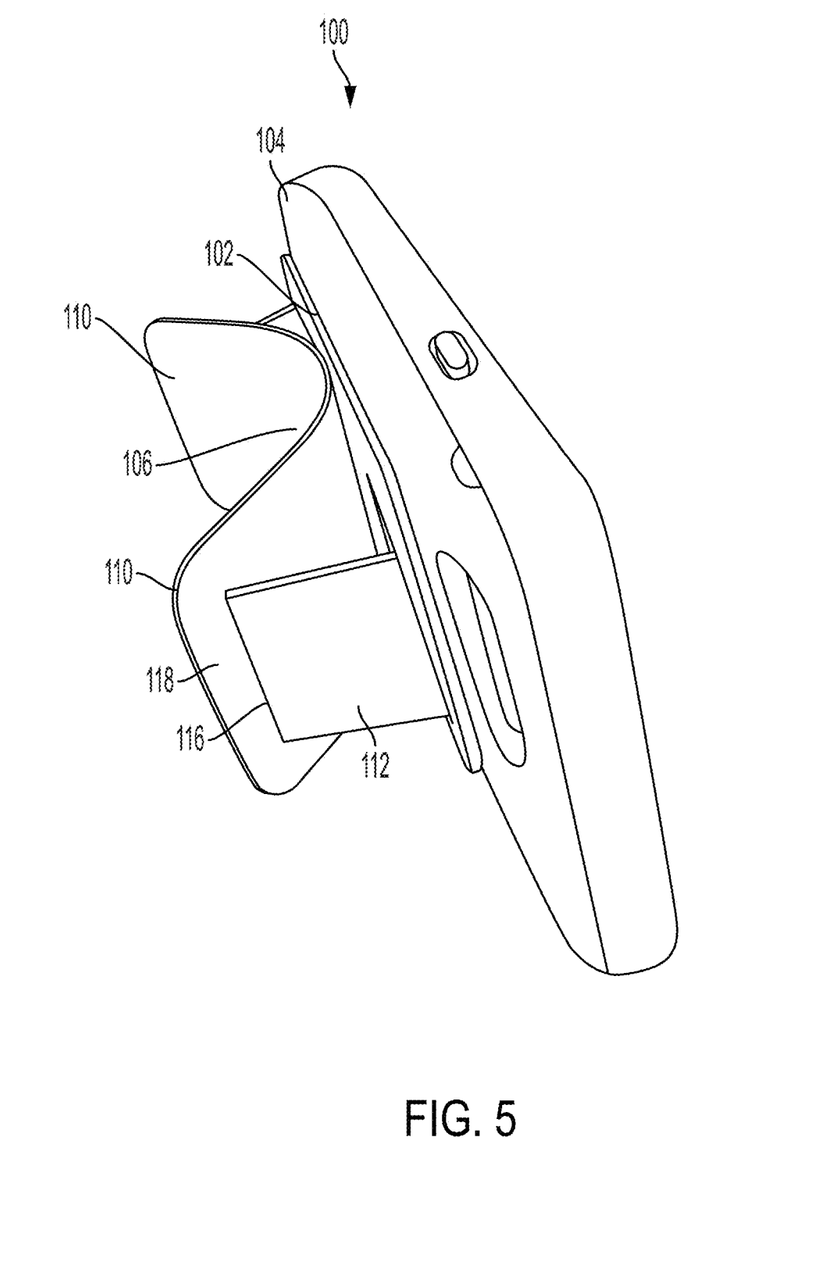
FIG. 5 is an illustration of the flexible stand in the extended position and functioning as a horizontal stand to support the portable electronic device in a horizontal orientation, according to one embodiment of the invention.

FIG. 5 is an illustration of the stand and shoulder rest 100 in the open, extended position and in use as a stand for the portable electronic device in a horizontal orientation, with the flexible plate 106 extended away from the base plate 102 in the extended position at both end portions 110. The slidable support mounts 112 are also extended in their open positions to maintain the extended position of both ends portions 110. As mentioned above, the second end 116 of the slidable support mount 112 may be hingedly attached with a bottom surface 118 of the flexible plate to allow the support mount 112 to easily move from the closed, non-extended position to the open, extended position.

Figure 6:
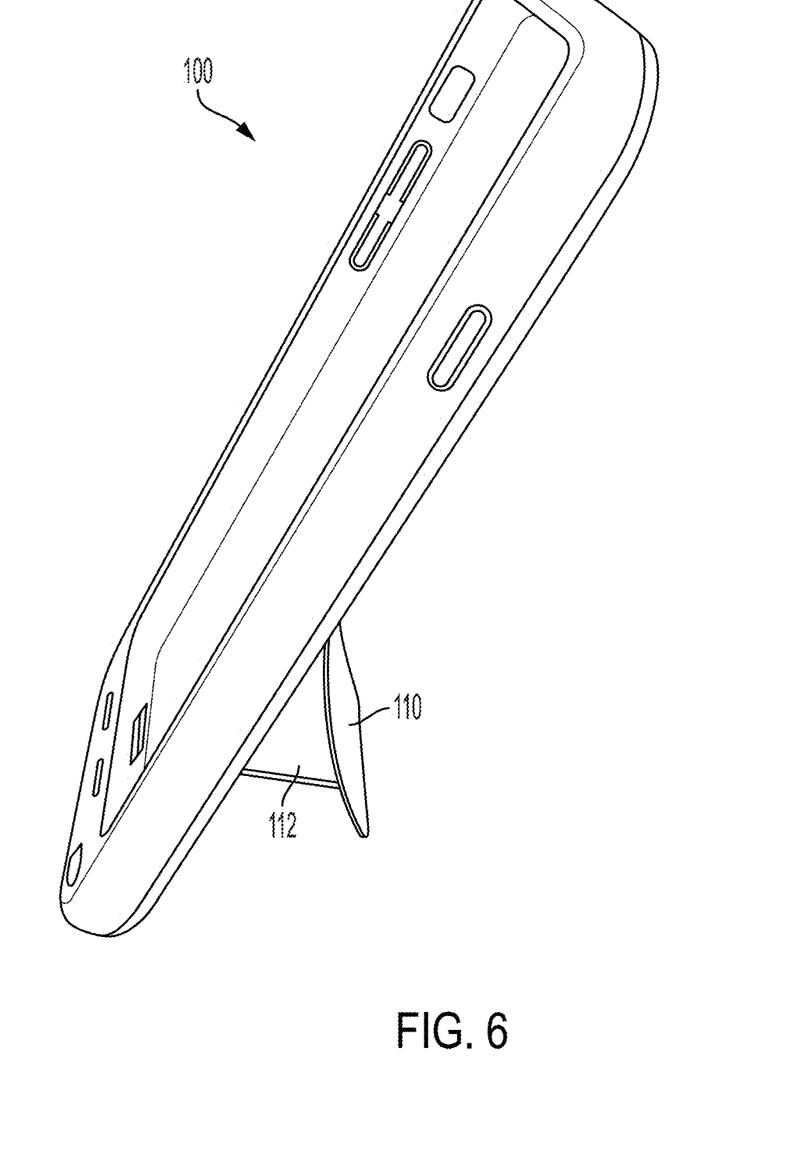
FIG. 6 is an illustration of the flexible stand in a half-extended position and functioning as a vertical stand with only one end of the top plate extended such that the stand supports the portable electronic device in a vertical orientation, according to one embodiment of the invention.

Similarly, FIG. 6 is an illustration of the stand and shoulder rest 100 in a partially open position where only one end portion 110 of the top plate 106 is in the extended position, such that the stand allows the portable electronic device to rest in a substantially vertical orientation. This embodiment illustrates how each end moves independently from the other, as the opposing end 110 of the flexible plate remains in the closed position, flush against the base plate 102.

As a shoulder rest, the device may be utilized in either a partially-opened position or fully-opened position to help maintain the portable electronic device against a curved shoulder of the user by bracing the portable electronic device with the shoulder rest between the side of the user's head and the user's shoulder when the user is talking. In a fully opened position with both ends 110 in the extended position, the shoulder rest 100 will keep the portable electronic device from moving in any vertical direction—either up or down—by conforming the curved surface of the flexible plate 106 to the curved surface of a user's shoulder. However, as a user typically rests a portable electronic device on a front portion of a shoulder, it is possible that only the end 110 near a top portion of the portable electronic device needs to be moved into the curved position in order to comfortably and adequately maintain the portable electronic device against the shoulder.

Figure 7:
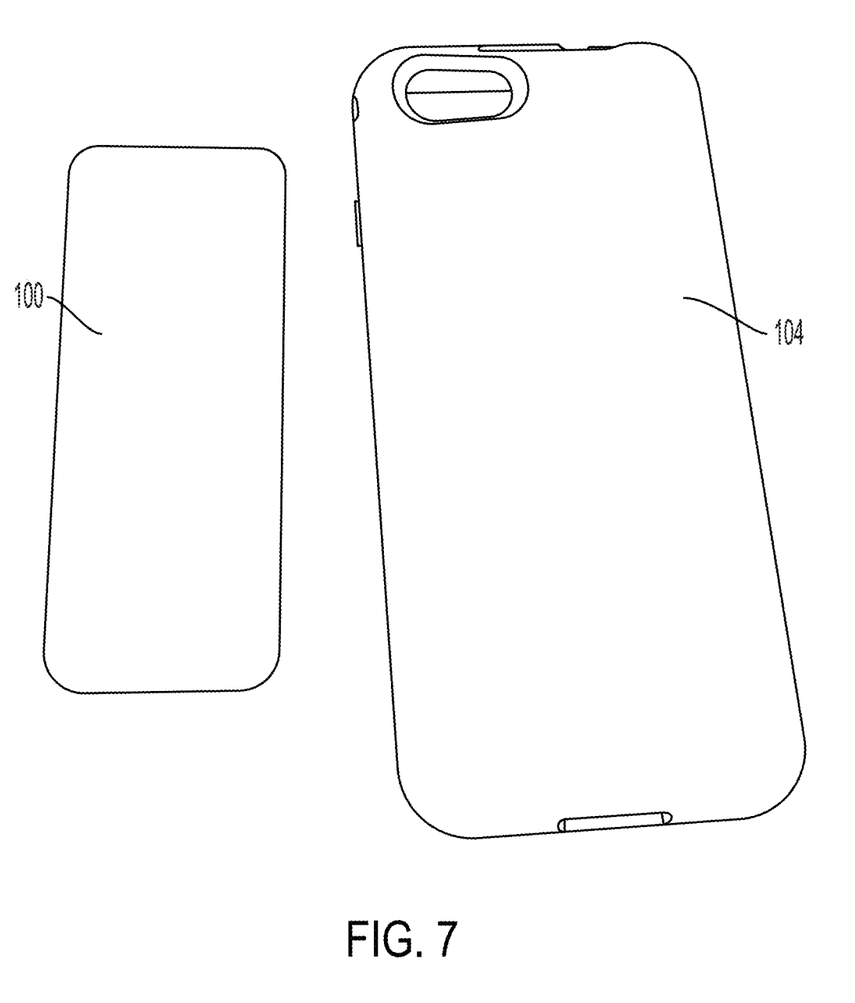
FIG. 7 is an illustration of the flexible stand in a flat, non-extended position and separate from the portable electronic device, according to one embodiment of the invention.

FIG. 7 illustrates the stand and shoulder rest 100 in the closed position and prior to attachment with the back surface 104 of the portable electronic device. In this top-down view, the size of the stand and shoulder rest 100 relative to the portable electronic device can be noted, as the stand and shoulder rest 100 is substantially smaller in width and height than the portable electronic device to which it attaches. The specific dimensions of the stand and shoulder rest 100 may vary significantly primarily based on the size of the portable electronic device to which it is being attached, and also based on the desired angles that the portable electronic device rests against a flat surface when being used as a stand, or against a shoulder when being used as a shoulder rest.

The stand and shoulder rest 100 may be configured of a multitude of materials, such as thermoplastic polyurethane, metal or aluminum, or other durable material which is flexible enough for use in the flexible plate but rigid enough to support the portable electronic device when acting as a stand or shoulder rest. In one embodiment, the top plate and/or base plate may be magnetized or embedded with magnets that magnetically retain the top plate to the base plate in the flat, un-extended position. Additionally, the base plate may be magnetized so that it can be magnetically secured with the portable electronic device or a case for the portable electronic device.

Additionally, certain types of materials or mechanisms may be utilized for and with the flexible top plate that may obviate the need for the use of the support mounts by allowing the top plate to remain in the extended position. For example, certain types of plastics or metals may be utilized which may be formed into the extended position as a default or baseline position and be forced into the un-extended position when the stand or shoulder rest is not in use. In this situation, the base plate may act to physically or magnetically retain the top plate in the closed, un-extended position through a snap, latch, tab, magnet or other securing mechanism. The user may then unlock the securing mechanism and allow the top plate to extend outward into the extended position.

In a further embodiment, the top plate may be formed into two separate pieces of the two opposing end portions 110 joined together at the center portion 108 by a hinge or other flexible connection mechanism which allows the end portions 110 to rotate from the non-extended position to the extended position. In this embodiment, the flexible connection mechanism may also be capable of locking the end portions 110 in the extended position, such that the support mounts are not needed.

Figure 8:
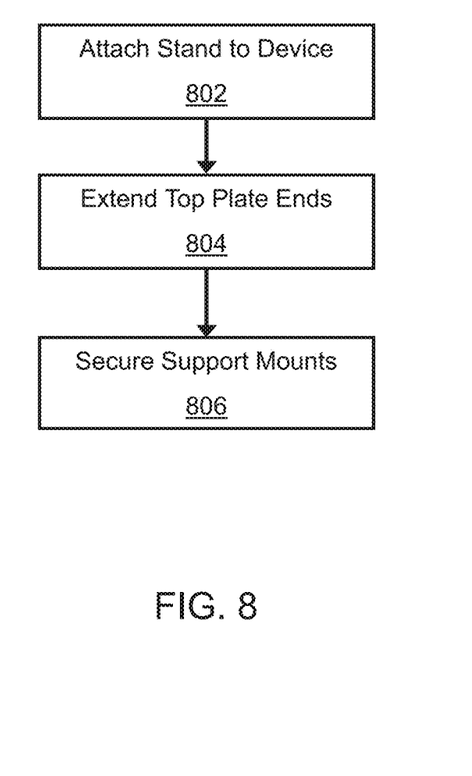
FIG. 8 is a block diagram illustrating a method of using the flexible stand for a portable electronic device, according to one embodiment of the invention.

FIG. 8 is a flow diagram illustrating one embodiment of a method of using a stand for a portable electronic device.

In a first step 802, a base plate of the stand is attached with a back surface of a portable electronic device. In step 804, at least one end portion of a top plate is extended away from the base plate into an extended position; and in step 806, the at least one end portion of the top plate in the extended position is secured with a slidable support mount hingedly connected with a lower surface of the top plate and slidably connected with an opening in the base plate.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A stand and shoulder rest for a portable electronic device, the stand and shoulder rest comprising:
    a base plate for securely attaching with a back surface of the portable electronic device;
    a flexible top plate with two end portions extending in opposite directions from a center portion, wherein the center portion is securely attached with a center portion of the base plate and wherein at least one of the end portions extends from an un-extended position abutting the base plate into an extended position at an approximately acute angle relative to the base plate; and
    top plate support mounts supporting the end portions of the top plate in the extended position, the support mounts hingedly connected on a first end with an end portion of the flexible top plate and slidably secured at a second end within an opening in the base plate such that the second end of the support mounts are configured to slide from a closed position parallel and adjacent with the base plate into an extended position substantially perpendicular to the base plate.

2. The stand and shoulder rest of claim 1, wherein the base plate is securely attached with the back surface of the portable electronic device using an adhesive material.

3. The stand and shoulder rest of claim 1, wherein the base plate is magnetically secured with a protective cover on the back surface of the portable electronic device.

4. The stand and shoulder rest of claim 3, wherein the base plate is integrated into the protective cover on the back surface of the portable electronic device.

5. The stand and shoulder rest of claim 1, wherein the flexible plate is formed from metal.

6. The stand and shoulder rest of claim 1, wherein the flexible plate is formed from plastic.

7. The stand and shoulder rest of claim 1, wherein the flexible plate is substantially curved in the extended position.

8. The stand and shoulder rest of claim 7, wherein the angle between the at least one end of the extended flexible top plate and the base plate is approximately 30 degrees to approximately 90 degrees.

9. The stand and shoulder rest of claim 1, wherein the top plate support mounts further comprise a first end slidably connected with the base plate and a second end hingedly connected with the flexible plate.

10. The stand and shoulder rest of claim 8, wherein the top plate support mounts are disposed within an opening in the base plate.

11. The stand and shoulder rest of claim 9, wherein the first end is slidably connected with the base plate via parallel tracks disposed along lateral sides of the opening which interface with posts extending from the first end of the slidable support arms.

12. The stand and shoulder rest of claim 11, wherein the posts will lock into a position along the parallel tracks in order to secure the flexible plate in the curved position.

\* \* \* \* \*